J. S. DUNCAN.
COMBINED PRINTING AND IDENTIFICATION DEVICE.
APPLICATION FILED FEB. 3, 1917.
1,288,396. Patented Dec. 17, 1918.
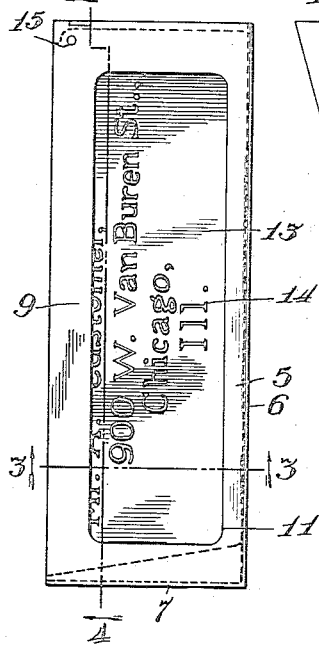
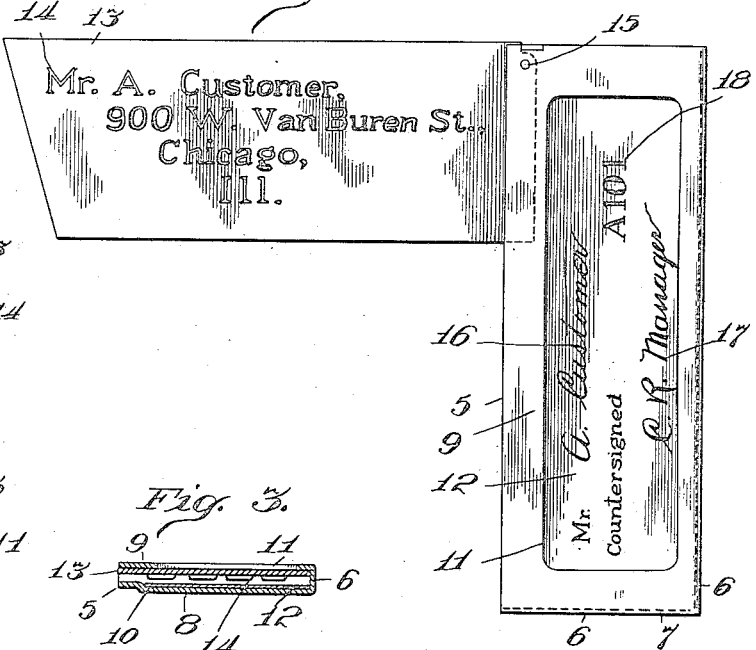
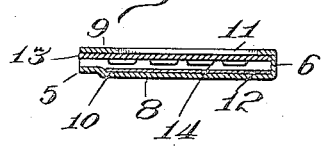
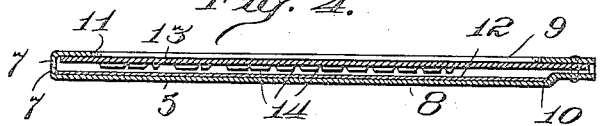
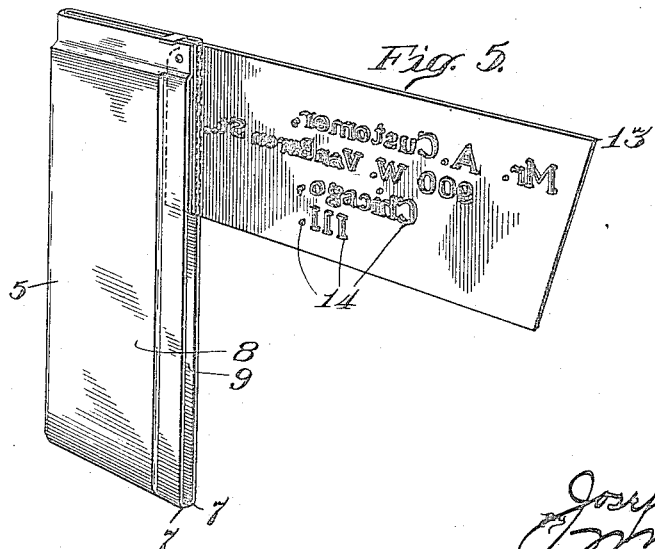

UNITED STATES PATENT OFFICE.

JOSEPH S. DUNCAN, OF CHICAGO, ILLINOIS, ASSIGNOR TO ADDRESSOGRAPH COMPANY, OF CHICAGO, ILLINOIS, A CORPORATION OF ILLINOIS.

COMBINED PRINTING AND IDENTIFICATION DEVICE.

1,288,396.  Specification of Letters Patent.  Patented Dec. 17, 1918.

Application filed February 3, 1917. Serial No. 146,369.

*To all whom it may concern:*

Be it known that I, JOSEPH S. DUNCAN, a citizen of the United States, residing at Chicago, in the county of Cook and State of Illinois, have invented certain new and useful Improvements in Combined Printing and Identification Devices, of which the following is a specification.

The object of this invention is the provision of a combined printing and identification device of small size and compact form, adapted for use in suitable machines to secure impressions therefrom and convenient as means of identifying the individual who carries the device.

My invention is peculiarly designed and adapted for use in connection with credit sales at retail stores and the purpose of my invention will be more apparent when it is understood that retail stores and particularly large department stores experience large yearly losses because of the inaccurate delivery information and the dishonest use by unauthorized persons of the names of customers having credit accounts at such stores. Much of this loss is directly due to inability of salespersons to spell names of customers or streets correctly or carelessness in noting or transferring names and numbers and to the impossibility of positively identifying persons purchasing goods and representing themselves as customers having accounts.

If goods can not be delivered by reason of inaccurate direction the sale is generally lost and the expense of delivery must be charged to the delivery overhead with no profit to offset it. Frequently, moreover, the customer may become incensed by frequent occurrences of this kind and withdraw his patronage. If goods are delivered to the wrong address and can not be traced or to persons who have deliberately used the names of customers having accounts with intent to defraud it is obvious that the store incurs the loss of the goods as well as the loss due to the cost of delivery.

I propose to overcome these difficulties by providing each customer having a charge account with a compact and simple printing device bearing his name and address and any other suitable information in printing characters so that the salesperson may print with the aid of a suitable machine the name and address of the customer on the sales slip, shipping tag, etc. At the same time my device is equipped with means for identifying the customer by signature, photograph or otherwise and the device may also bear the signature of an officer of the store and the credit-rating or other information relative to the customer so that sales may be facilitated and the possibility of loss to the store eliminated.

It is the object, therefore, of my invention to provide a printing device and means for protecting the printing characters thereon and the hands of the user from becoming soiled with ink as well as to provide an identification card bearing information which may facilitate the use of my invention.

Further objects and advantages of my invention will be apparent as it is better understood by reference to the following specification when read in connection with the accompanying drawing, illustrating the preferred embodiment thereof, in which—

Figure 1 is a plan view of the front of the device with the printing device in its normal position;

Fig. 2 is a similar view with the printing device in printing position;

Fig. 3 is a section on the line 3—3 of Fig. 1;

Fig. 4 is a section on the line 4—4 of Fig. 1, and

Fig. 5 is a view in perspective illustrating the back of the device with the printing device in printing position.

Referring to the drawing, 5 indicates a holder which is preferably constructed of a sheet of metal bent upon itself at 6 to form a closed edge and having inturned flanges 7 at one end which serve to space the back 8 and front 9 of the holder. A portion of the back 8 is struck outwardly forming a recess 10 and the front is provided with an opening 11 through which the information card 12 is visible when the printing device 13 is disposed in printing position.

The printing device 13 preferably comprises a metal plate having printing characters 14 struck up from the body thereof, the printing characters forming the name and address of the customer. The printing device 13 is pivotally connected at 15 to one corner of the holder and is adapted to swing through the open edge of the holder from its normal position, as illustrated in Fig. 1, in which it conceals the information card 12 to the position indicated in Fig. 2, in which position it is adapted to be inserted in a suitable machine for securing an impression. The printing device 13 is mounted so that the printing characters 14 face the back 8 when the parts are in the position indicated in Fig. 1. Thus the printing characters are protected from injury and the hands of the users are protected from the ink, some of which necessarily adheres to the printing characters after each use of the device.

When the printing device 13 is moved to printing position the information card 12 is exposed. This card preferably bears the signature 16 of the customer and the signature 17 of some officer of the store such for example as the credit-rating manager and may also bear code information as indicated at 18, indicating the credit-rating of the customer or any other information which may be desirable in connection with sales. The information card 12 may be covered, if desired, with a sheet of celluloid or other transparent material to protect it from the ink on the printing characters 14.

From the foregoing it will be readily understood that I have perfected a simple printing device which is so compact that it may be readily carried in the pockets or otherwise about the person of the individual user and is, therefore, readily available as a means of identification when a purchase is contemplated. At such times the device will be handed to the salesperson who, being provided with a suitable machine, will insert the printing device in the machine and print the name and address of the purchaser directly upon the sales slip and shipping tag. Should there be any question about the identity of the person presenting the device he may be asked to sign his name for comparison with the signature on the information card. Thus the store and credit customers are protected and the comparatively large losses now incidental to credit sales are entirely obviated.

It will be apparent that various changes may be made in the form, construction and arrangement of the parts without departing from the spirit and scope of the invention or sacrificing any of its material advantages the form hereinbefore described being merely a preferred embodiment thereof.

I claim:

1. In a device of the character described, the combination of a holder having a back, a printing device pivotally connected to and normally disposed within said holder with the printing characters thereon spaced from said back, said printing device being adapted to swing in the plane thereof from said holder when an impression is to be taken therefrom.

2. In a device of the character described, the combination of a holder having a back and a printing device pivotally connected to said holder and adapted to be normally disposed with the printing characters thereon facing and spaced from said back.

3. In a device of the character described, the combination of a holder having a back, a printing device pivotally connected to said holder and adapted to be normally disposed therein with the printing characters thereon facing said back, and an information card supported in said holder between said back and printing device, and covered by said printing device when the latter is in closed position.

4. In a device of the character described, the combination of a holder having a recessed back, a printing device pivotally connected to said holder and adapted to be withdrawn from said holder when an impression is to be taken therefrom, and an information card supported in the recess of said back and covered by said printing device when the latter is in closed position.

5. In a device of the character described, the combination of a holder having a closed back and an open front, a printing device pivotally connected to said holder and adapted to be withdrawn therefrom when an impression is to be taken, and an information card supported in said holder between said printing device and back covered by said printing device when the latter is in closed position, and adapted to be exposed when said printing device is withdrawn.

6. In a device of the character described, the combination of a holder, an information card in said holder, and a printing device pivotally connected to said holder and adapted when in closed position to overlie said information card.

7. In a device of the character described, the combination of a holder having a closed back and an open front, a printing device pivotally connected at one end to said holder, one edge of said holder being open whereby said printing device may be swung outwardly to printing position, and an information card supported in said holder between said printing device and back covered by said printing device when the latter is in closed position, and adapted to be exposed when said printing device is in printing position.

8. In a device of the character described, the combination of a holder having an opening in one side, an information card supported in said holder facing said opening, and a printing device pivotally connected to said holder and concealing said card when said printing device is in closed position.

JOSEPH S. DUNCAN.

Witnesses:
W<sup>M</sup> O. BELT.
M. A. KIDDIE.